United States Patent
Yumita (10) Patent No.: US 6,768,218 B2
(45) Date of Patent: Jul. 27, 2004

(54) SMALL HYDROELECTRIC POWER GENERATOR

(75) Inventor: Yukinobu Yumita, Shimosuwa-machi (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 10/056,477

(22) Filed: Jan. 23, 2002

(65) Prior Publication Data

US 2002/0113442 A1 Aug. 22, 2002

(30) Foreign Application Priority Data

Feb. 9, 2001 (JP) ........................................ 2001-033204

(51) Int. Cl.[7] .............................................. H02P 9/04
(52) U.S. Cl. ........................................... 290/54; 290/43
(58) Field of Search ............................. 290/54, 43, 44, 290/53, 55; 322/3, 10

(56) References Cited

U.S. PATENT DOCUMENTS

| | | | | |
|---|---|---|---|---|
| 2,276,714 A | * | 3/1942 | Brown ........................ | 415/203 |
| 4,272,685 A | * | 6/1981 | Toyama ........................ | 290/52 |
| 4,392,063 A | * | 7/1983 | Lindquist ...................... | 290/54 |
| 4,488,055 A | * | 12/1984 | Toyama ........................ | 290/53 |
| 4,731,545 A | * | 3/1988 | Lerner et al. .................. | 290/54 |
| 6,208,037 B1 | * | 3/2001 | Mayo et al. ................... | 290/54 |
| 6,509,652 B2 | * | 1/2003 | Yumita ......................... | 290/54 |
| 6,559,553 B2 | * | 5/2003 | Yumita et al. ................. | 290/54 |
| 2002/0113442 A1 | * | 8/2002 | Yumita ......................... | 290/54 |
| 2003/0127861 A1 | * | 7/2003 | Yumita et al. ................. | 290/43 |
| 2003/0164612 A1 | * | 9/2003 | Yumita ......................... | 290/1 R |

* cited by examiner

Primary Examiner—Nicholas Ponomarenko
Assistant Examiner—Heba Elkassabgi
(74) Attorney, Agent, or Firm—Reed Smith LLP (57) ABSTRACT

According to the small hydroelectric power generator of the present invention, each of the outer peripheral portions of the hydraulic turbine which oppose to the ejecting openings are made in an edge shape. Therefore, the ejecting openings will not be blocked by the outer peripheral portions of the hydraulic turbine, keeping the hydraulic pressure constant. Also, since the water is constantly ejected from the ejecting openings at a plurality of locations, the hydraulic turbine rotates smoothly, reducing the rotational noise. Furthermore, the hydraulic pressure and the current are kept constant and in turn the vibration noise from the case and the current noise are reduced. Moreover, the square corners and the edges are eliminated from the back planes of the blade members to give an R-like round shape; therefore, a reverse torque is prevented from occurring to smoothen the current and in turn to reduce the noise.

6 Claims, 12 Drawing Sheets

PRIOR ART

Fig. 9

PRIOR ART

PRIOR ART

SMALL HYDROELECTRIC POWER GENERATOR

FIELD OF THE INVENTION

The present invention relates to an improvement of a small hydroelectric power generator which uses hydroelectric power generated by the flow of water through a faucet.

BACKGROUND OF THE INVENTION

Conventionally well-known is an automatic tap apparatus that lets water flow as a sensor senses the presence of a hand placed beneath a faucet.

The configuration of the above mentioned small hydroelectric power generator is briefly described below. In a small hydroelectric power generator, a fluid inlet path and a fluid outlet path are provided in a main case and a partition ring is located therebetween. The water entering the fluid inlet path is divided along a cylindrical wall of the ring and ejected through ejecting openings created in the cylindrical wall.

The ejected water hits on and turns a hydraulic turbine, which is rotatably arranged inside the wall, and exits from the water outlet. A rotator is fixed integrally to a rotary shaft of the hydraulic turbine. The outer circumferential surface of the rotator is magnetized in order to be a rotor magnet. A stator is opposed to the outer circumferential surface of the rotor magnet, interposing a stainless steel partition. A power generating coil is provided in the stator so that, as a magnetic flux enters the stator, the magnetic flux and the coil are inter-linked to generate power.

Figure 8A:
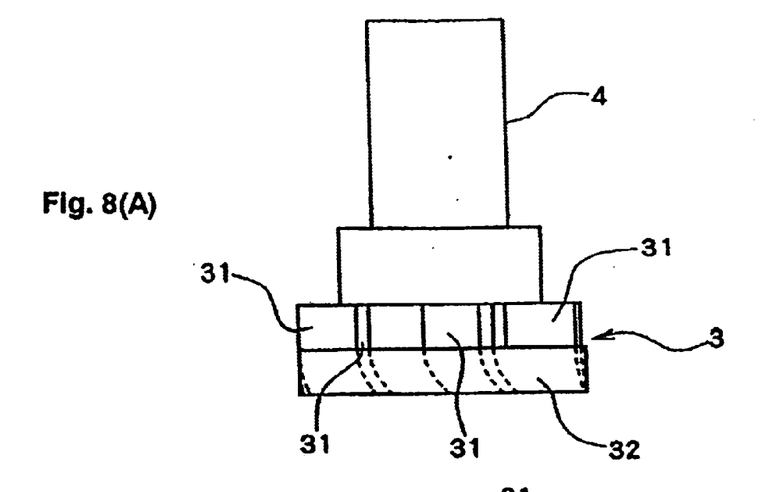
FIGS. 8(A), (B), and (C) are respectively a front view, a plan view, and a bottom view.
Figure 8B:
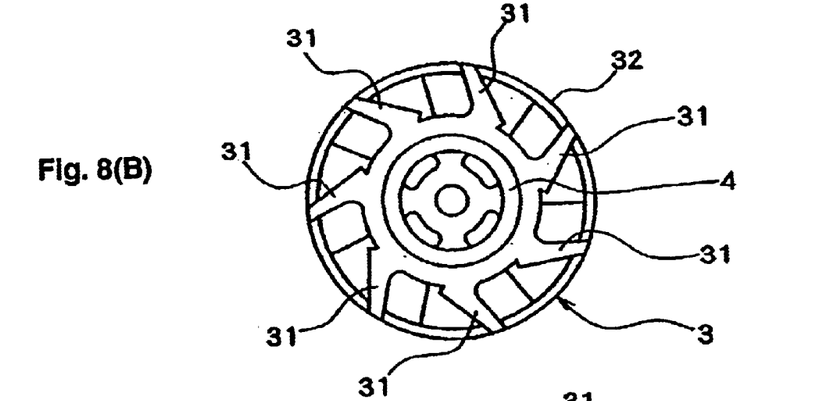
Figure 8C:
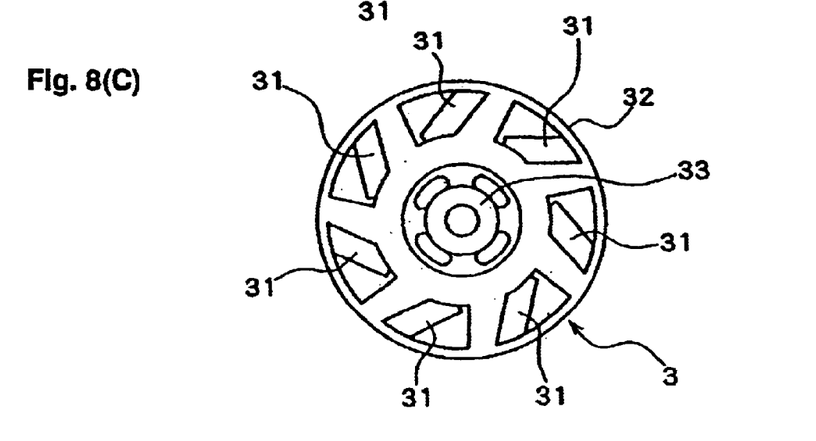

FIG. 8 shows an example of the configuration of a hydraulic turbine and a rotator (a magnet and a rotary shaft are not included), which are used in the above mentioned small hydroelectric power generator: FIGS. 8(A), (B) and (C) are respectively a front view, a plan view, and a bottom view thereof. In FIG. 8, the hydraulic turbine 3 comprises a rotational center portion 33 which is to be placed around and fixed to the rotary shaft, a plurality of blade members 31 which are joined to the rotational center portion 33 by inner peripheral end portions 33 thereof, and a cylindrical ring portion 32 to which outer peripheral point portions of the blade members 31 are joined. A rotator 4 is formed integrally with the hydraulic turbine.

Figure 10A:
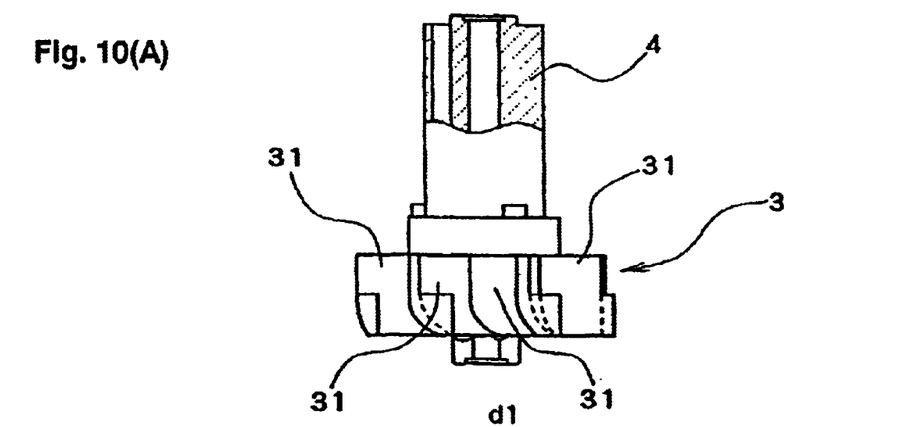
FIGS. 10(A),(B), and (C) are respectively a front view, a plan view, and a bottom view.
Figure 10B:
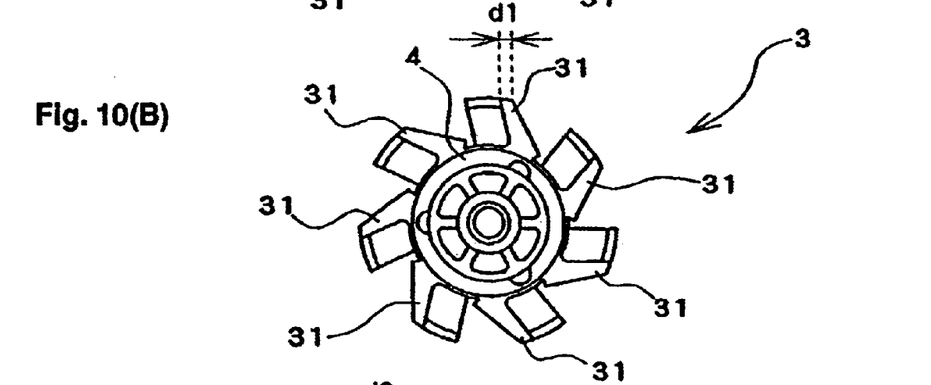
Figure 10C:
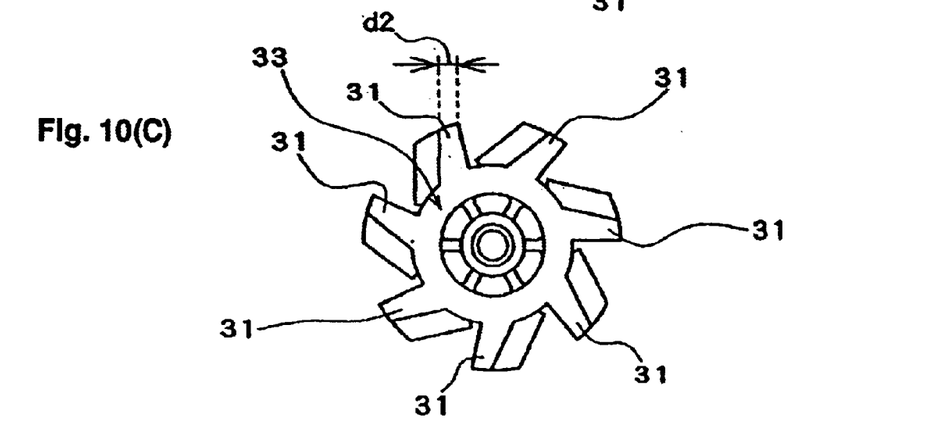

FIG. 10 shows another example of the configuration of the hydraulic turbine and the rotator used in the above mentioned small hydroelectric power generator: FIGS. 10(A), (B) and (C) are respectively a front view, a plan view, and a bottom view thereof. The hydraulic turbine 3 comprises the rotational center portion 33 which is placed around and fixed to the rotary shaft, and a plurality of blade members 31 which are joined to the rotational center portion 33 by the inner peripheral point portions thereof. The hydraulic turbine 3 in FIG. 10 is configured without the ring portion 32 which is present in FIG. 8.

However, in the above mentioned small hydroelectric power generator, when the flow of the water passing through the fluid path increases, the following problem occurs: when the hydraulic turbine 3 rotates as the water passes by, the outer peripheral point portions of the blade members 31 temporarily block a portion of ejecting openings 22; therefore, the hydraulic pressure is inconstantly applied onto the blade members 31.

Figure 11:
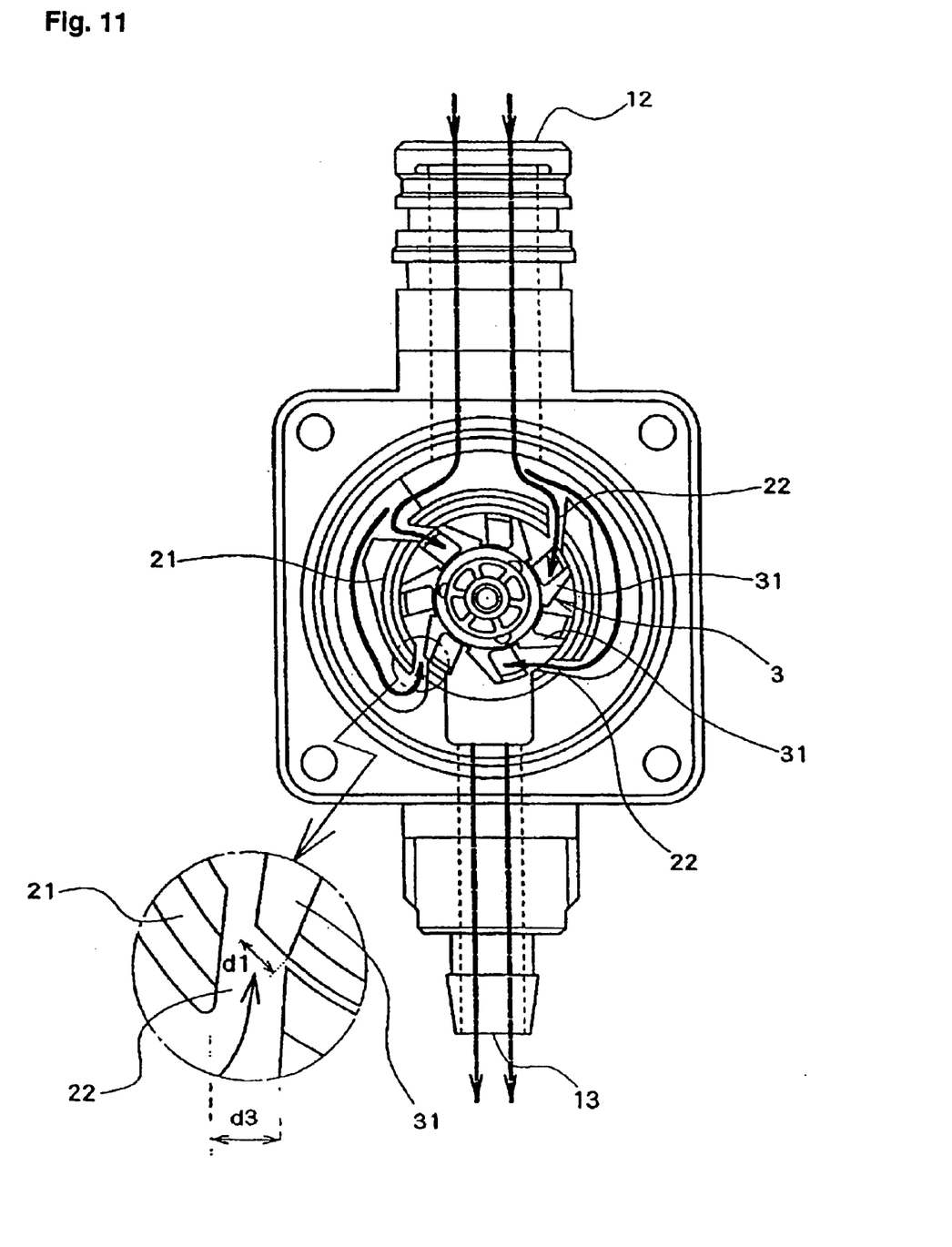
FIG. 11 is a diagram showing the positional relationship between the blade members of the hydraulic turbine and the ejecting openings of FIG. 10.

In other words, each of the blade members 31 of the hydraulic turbine 3 of FIG. 10 is configured such that the width, d1, of the outer peripheral point portion in the plan view and the width, d2, of the outer peripheral point portion in the bottom view are respectively set to about 1 mm. For this reason, as illustrated in FIG. 11 containing a sectionally enlarged view, the ejecting openings 22 (The wider the width is, the more the fluid flows; however, the hydraulic pressure is decreased with the wider width and accordingly the power generating capability is reduced. So in this embodiment, the width, d3, is set to about 1.5 mm to obtain an appropriate power generating capability.) for ejecting water inside the water dividing ring-shaped wall portion 2, which is located between the water inlet path 12 and the water outlet path 13 and in which the hydraulic turbine 3 is provided, are partially blocked by the outer peripheral point portions of the blade members 31 when the hydraulic turbine 3 is turned. Consequently, the hydraulic pressure becomes inconstant and the rotation of the hydraulic turbine 3 becomes imbalanced, causing vibrations to the entire tap. Thus, this increases the rotation noise as well as the vibration noise.

Figure 9:
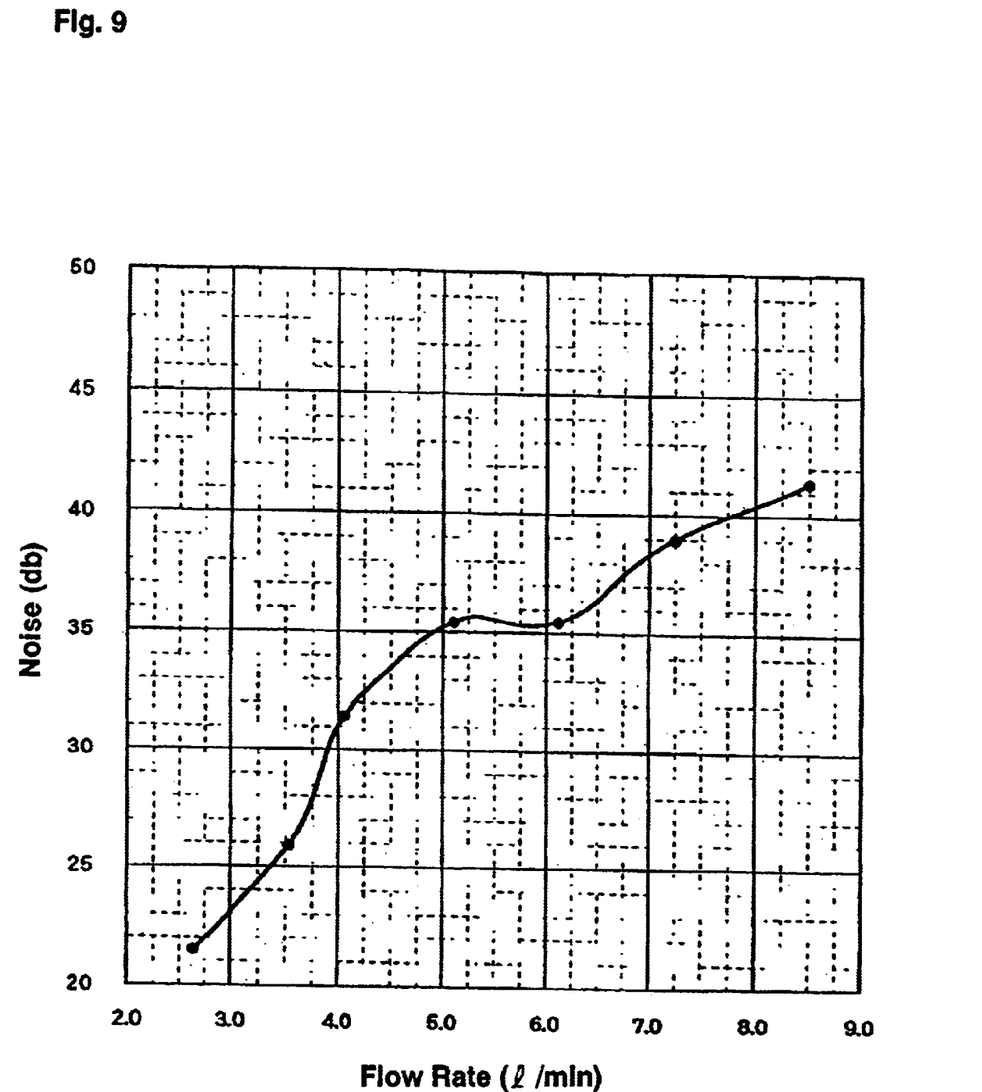
FIG. 9 is a graph of flow rate versus noise when the hydraulic turbine and the rotator of FIG. 8 are used.

The above mentioned problem occurs with the hydraulic turbine and the rotator of both FIG. 8 and FIG. 10. FIG. 9 is a graph of flow rate (liter/min) versus noise (decibel) when the hydraulic turbine and the rotator of FIG. 8 are used. The noise above 35 decibel occurs at a flow rate of about 6.0 liter/min.

Figure 12:
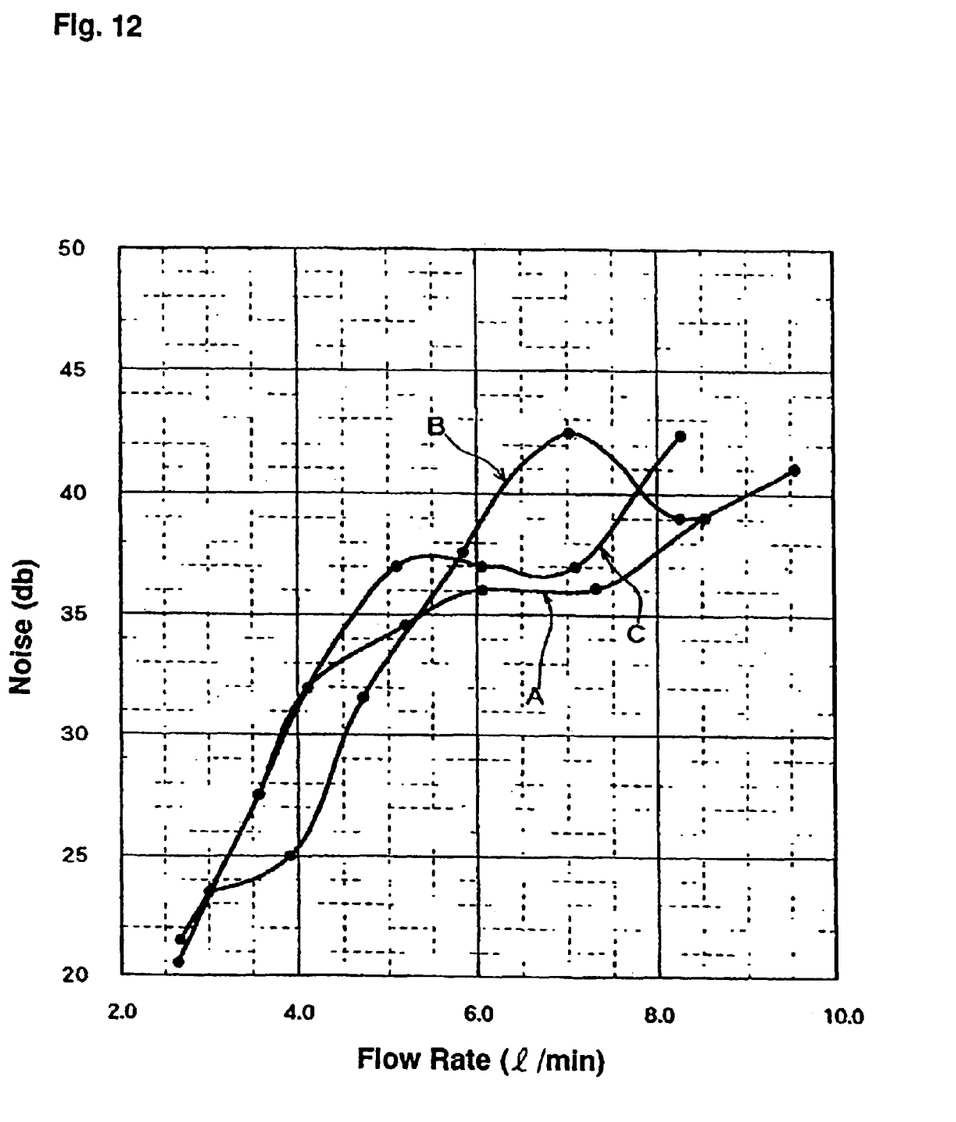
FIG. 12 is a graph of flow rate versus noise when the hydraulic turbine and the rotator of FIG. 10 are used.

In the same manner, FIG. 12 is a graph of the flow rate (liter/min) versus the noise (decibel) when the hydraulic turbine and the rotator of FIG. 10 are used. In the graph, A, B, and C are samples of the hydraulic turbine and the rotator of the same configuration. With each sample, the noise exceeding 35 decibel occurs at a flow rate of about 6.0 liter/min.

As described above, when the sound generated in the small hydroelectric power generator exceeds 35 decibel at a flow rate of about 6.0 liter/min, it becomes a harsh noise to the ear of the user using the automatic tap apparatus.

Thus, the objective of the present invention is to provide a small hydroelectric power generator in which the noise generation is reduced by improving the configuration of the hydraulic turbine.

SUMMARY OF THE INVENTION

To achieve the above objective, the present invention provides a small hydroelectric power generator having a main case equipped with a fluid path, a hydraulic turbine arranged in the fluid path and turned as a fluid of a predetermined flow passes by, a rotator connected to the hydraulic turbine to rotate together with the hydraulic turbine, the rotator acting as a rotor portion opposed to a stator portion, so that power is generated by rotating the rotor portion relative to the stator portion as the fluid passes by; wherein a plurality of ejecting openings are provided in the fluid path outside the rotational path of the hydraulic turbine for reducing an area of a flow of the fluid and then for ejecting the fluid; and the hydraulic turbine has a rotational center portion and blade members onto which the fluid ejected from the ejecting openings hits, each of the blade members being formed such that the inner peripheral end portion is joined with the rotational center portion and outer peripheral point portion is extended near the ejecting openings and formed in an edge-shape.

With this, the ejecting openings will not be blocked by the point portions of the blade members of the hydraulic turbine. Therefore, a constant hydraulic pressure is provided. Also, since the water is constantly ejected from the ejecting openings at a plurality of locations, the hydraulic turbine rotates smoothly, thus reducing the rotation noise. Further, the hydraulic pressure and the current are kept constant, and accordingly the vibration noise of the case and the current noise will be reduced.

According to another aspect of the invention, in the above small hydroelectric generator, the width of the portion, which is the point portion of the blade member and formed in edge, in the circumferential direction is set to 30% or less of the width of the ejecting opening in the rotational direction of the hydraulic turbine. For this reason, the ejecting openings are blocked less by the point portions of the blade members of the hydraulic turbine, compared to the one in a conventional configuration. Thus, vibrations and rotation noise which are normally caused by the change in the hydraulic pressure can be reduced.

Also, according to another aspect of the present invention, in each of the above small hydroelectric generator, the plane of the blade member, the side opposite from the plane which receives the fluid, is curved from the inner peripheral end portion to the outer peripheral point portion with the center portion projected. Since the curved planes are the front planes during the rotation, and the blade members can rotate receiving less resistance from the water. Therefore, the hydraulic turbine rotates smoothly. Accordingly, the rotational vibration and noise can be further reduced.

Further, according to another aspect of the present invention, in each of the above small hydroelectric generator, the rotational center portion of the blade member is formed in a shaft shape extending to be perpendicular to the direction in which the fluid is ejected from the ejecting openings, and rotating wings are provided extending from the outer peripheral point portions in the circumferential direction to be parallel to the rotational center portion formed in the shaft-shape so that the ejecting openings are not blocked. Therefore, the ejecting openings will not be blocked, increasing the rotation force of the hydraulic turbine.

BREIF DESCRIPTION OF THE DRAWINGS

FIG. 4 is a view of a configuration of the hydraulic turbine and rotator used in the small hydroelectric power generator of FIG. 1.

FIG. 8 is an example of the configuration of the hydraulic turbine and rotator used in a conventional small hydroelectric power generator.

FIG. 10 is another example of the configuration of the hydraulic turbine and rotator used in a conventional small hydroelectric power generator.

DETAILED DESCRIPTION OF THE INVENTION

An embodiment of a small hydroelectric power generator of the present invention is described hereinafter based on the drawings.

Figure 1:
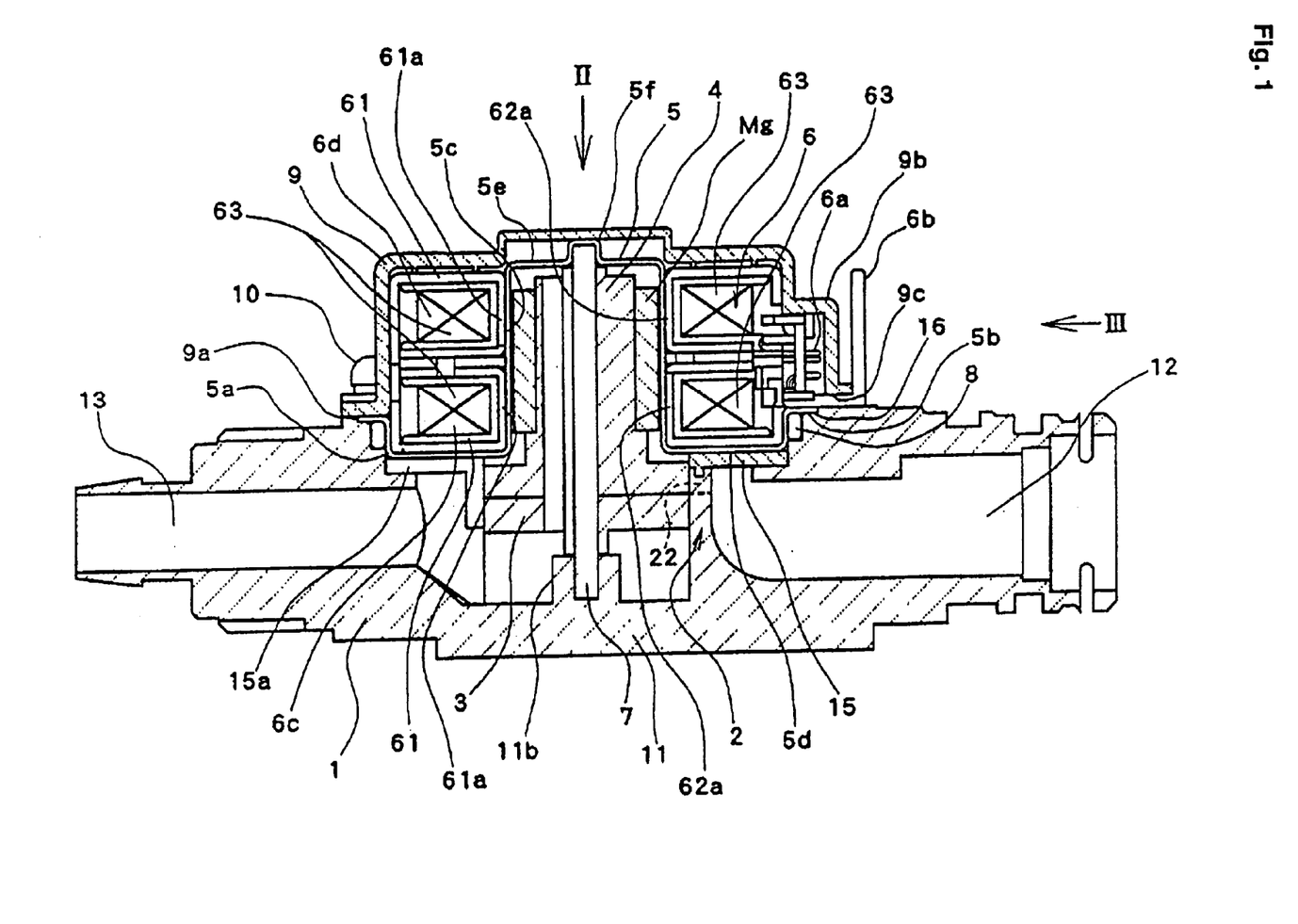
FIG. 1 is a longitudinal sectional view of a small hydroelectric power generator of an embodiment of the present invention.
Figure 2:
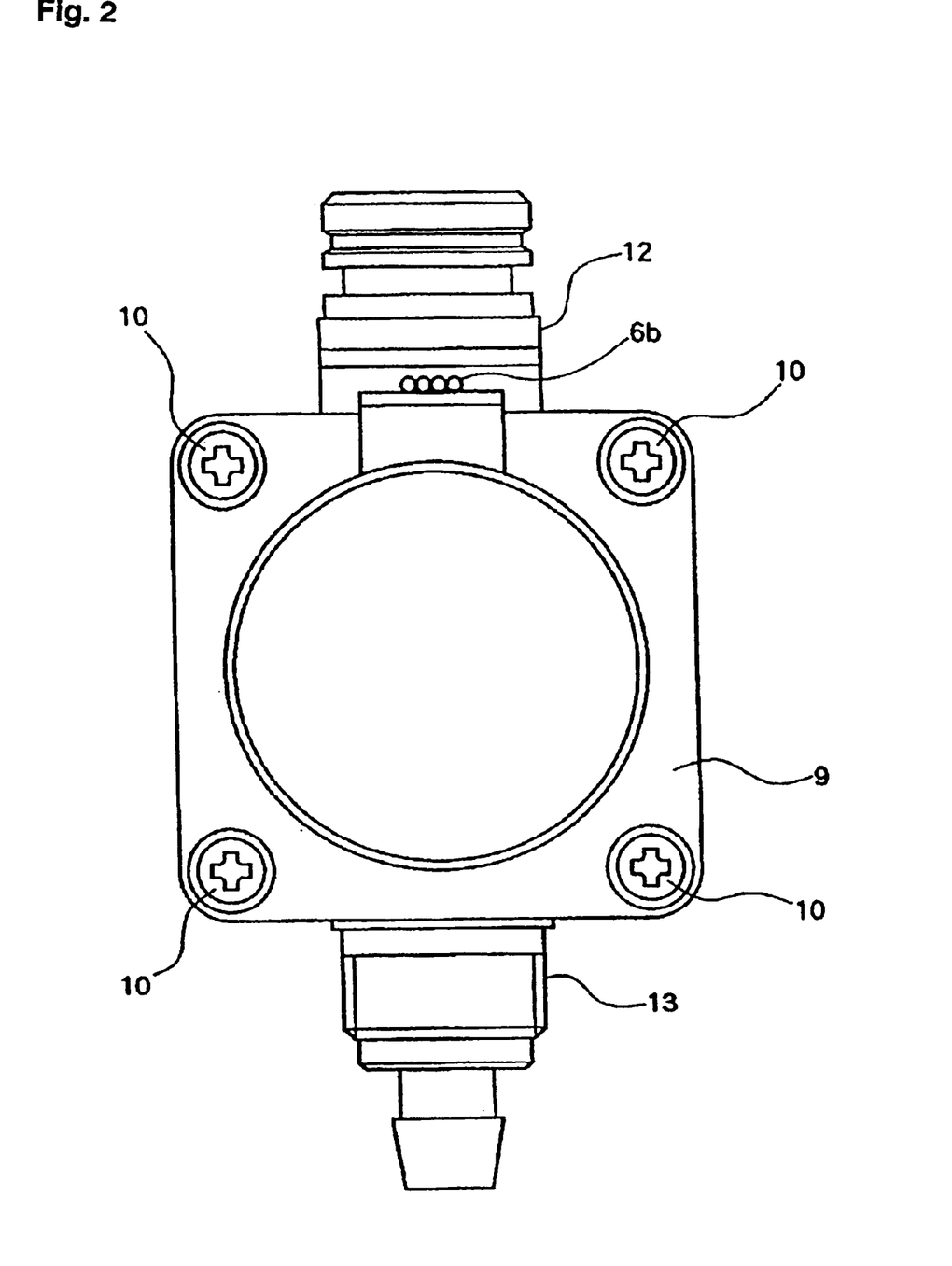
FIG. 2 is a side view of the small hydroelectric power generator of FIG. 1 taken along an arrow II in FIG. 1.
Figure 3:
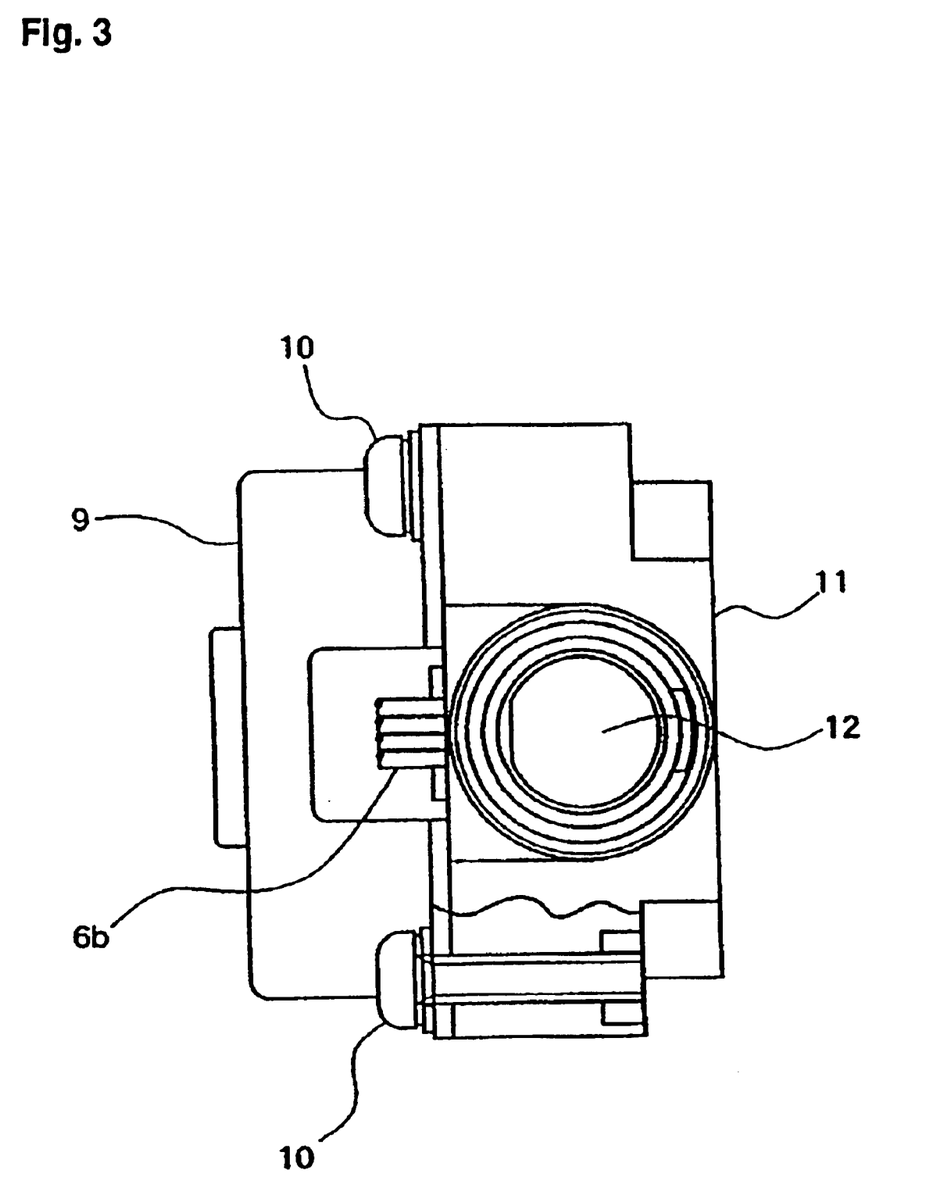
FIG. 3 is a plan view of FIG. 1 taken along an arrow III.
Figure 4A:
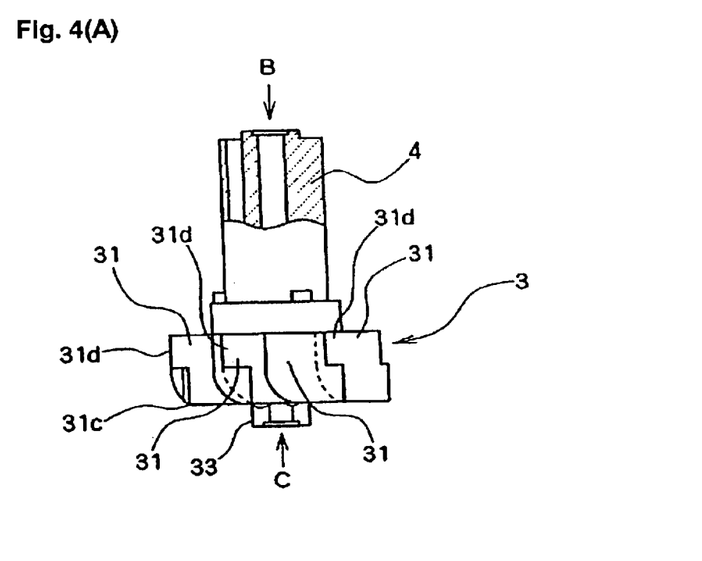
FIG. 4(A) is a front view.
Figure 4B:
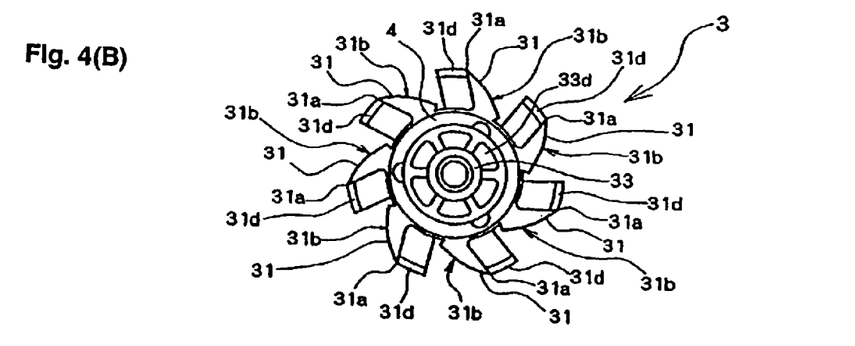
FIG. 4(B) is a plan view of FIG. 4(A) taken along an arrow B.
Figure 4C:
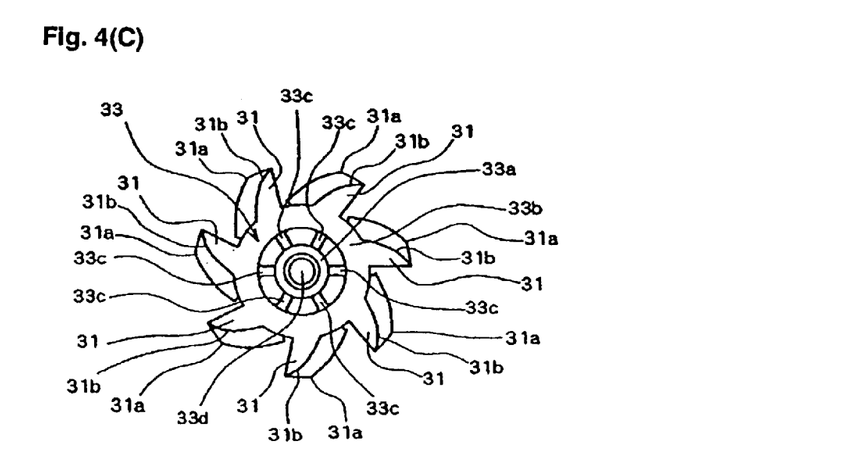
FIG. 4(C) is a bottom view of FIG. (A) taken along an arrow C.

FIG. 1 is a longitudinal sectional view of a small hydroelectric power generator of an embodiment of the present invention. FIG. 2 is a side view of the small hydroelectric power generator of FIG. 1 taken along an arrow II in FIG. 1. FIG. 3 is a plan view of the small hydroelectric power generator of FIG. 1 taken along an arrow III in FIG. 1. FIGS. 4(A) to (C) are views showing the configuration of the hydraulic turbine 3 and the rotator 4: FIG. 4(A) is a front view; FIG. 4(B) is a plan view of FIG. 4(A) taken along an arrow B; and FIG. 4(C) is a bottom view of FIG. 4(A) taken along an arrow C.

First, a basic configuration of the small hydroelectric power generator is described.

As shown in FIG. 1 through FIG. 3, a small hydroelectric power generator of this embodiment comprises a main case 1 having water inlet path 12 and water outlet path 13 as a fluid path, a ring-like wall portion 2 for ejecting a fluid provided in the main case 1 and being a part of the fluid path, a hydraulic turbine 3 arranged inside of the ring-like wall portion 2 to be turned as the fluid of a predetermined flow passes by, a rotator 4 connected to the hydraulic turbine 3 to rotate together with the hydraulic turbine 3, a stainless steel cup-shaped case 5 arranged outside of the rotator 4 and fitted into the main case 1 to create an inner space together with the main case 1, and a stator portion 6 provided outside of the cup-shaped case 5.

The main case 1 has a main portion 11 and the cylindrical inlet path 12 and outlet path 13 projecting outside of the main portion 11. The main portion 11 includes the ring-like wall portion 2, which surrounds the hydraulic turbine 3 to form water dividing portions, and a bearing hole 11b in which an end of a shaft 7 for supporting the rotator 4 is fitted and held.

The ring-like wall portion 2 reduces the area of the flow of the water entering from the inlet path 12 to increase the water force and then eject the water toward blade members 31 of the hydraulic turbine 3, and also to guide the water that has hit on the blade members 31 to the outlet path 13. The ring-like wall portion 2 is configured such that a plurality of walls (not shown) formed integrally with the main case 1 and a cover 15 covering the edge side of the walls create a plurality of ejecting openings 22 for reducing the area of the flow of the fluid and ejecting the fluid toward the blade members 31 of the hydraulic turbine 3.

A recess portion is provided in the main case 1 so that the cup-shaped case 5 and one of the axial ends of the stator portion fixed outside the cup-shaped case 5 are fitted therein. The bottom of the recess portion is for mounting a flat portion 15a of the donut-shaped cover 15 which is placed between the main case 1 and the cup-shaped case 5. The center portion of the bottom surface is made as an opening for inter-connecting the fluid path in the main case 1 with the inner space of the cup-shaped case 5. Through this opening, the inner space of the cup-shaped case 5 is inter-connected with the inlet path 12 and the outlet path 13.

The cup-shaped case 5 is formed of a non-magnetic stainless steel member, and has a flange portion 5b which is the outermost periphery thereof, an outer cylindrical portion 5a formed continuously inside of the flange portion 5b, a partition wall 5c provided inside of the outer cylindrical portion 5a for separating stator portion 6 from the inner space into which the water enters, a connecting surface portion 5d for connecting the outer cylindrical portion 5a and the partition wall 5c, and a bottom portion 5e.

The cup-shaped case 5 configured as above is fitted into the recess portion of the main case 1 interposing the flat portion 15a of the cover 15. An O-ring 8 is arranged outside of the outer cylindrical portion 5a. The O-ring 8 is pushed outward in the radial direction by the outer cylindrical portion 5a to be held between the outer cylindrical portion 5a and the inner wall of the recess portion. A bearing hole 5f is formed in the bottom portion 5e so that the other end of the shaft 7 supporting the hydraulic turbine 3 and the rotator 4 is fitted therein. The cup-shaped case 5 separates the stator portion 6 from the water passing through the main case 1 and prevents the water from leaking outside of the main case 1.

Note that the inlet path 12, the outlet path 13 and the main portion 11 for connecting both paths, which are formed in the main case 1, are to be placed in the fluid path of the Water Tap apparatus (not shown) constructed with a faucet, a valve, etc. So that the fluid entering the inlet path 12 from the fluid source is guided to the path through the ring-like wall portion 2 provided inside the main portion 11 and is ejected from the outlet path 13. Note that the fluid provides a force when passing by, to the hydraulic turbine 3 causing it to rotate.

As described above, after the cup-shaped case 5 is fitted into the main case 1 and the stator portion 6 is arranged outside of the case 5, a resin case 9 is placed over the cup-shaped case 5 and the stator portion 6 to cover them. A hood portion 9b is provided to the resin case 9 to cover a terminal portion 6a projecting from the stator portion 6 outward in the radial direction. Then, a pulling portion 9c is provided to the hood portion 9b for pulling an end of a lead wire 6b, the other end of which is connected to the terminal portion 6a, toward the outside. A sealing agent (not shown) is filled in the pulling portion 9c to seal the stator portion 6 from the outside so that the water is prevented from entering the stator portion 6 from the outside through the pulling portion 9c. Note that the resin case 9 is screwed onto the main case 1 with a screw 10. With this configuration the cup-shaped case 5 and the stator portion 6 are prevented from coming off the main case 1 or moving from the fixed positions.

The hydraulic turbine 3 arranged inside the above mentioned water-ejecting ring-like wall portion 2 is turned as the fluid of a predetermined flow passes through. As shown in FIG. 4, the hydraulic turbine 3 is configured with the rotational center portion 33 placed around the shaft 7 and arranged to be perpendicular to the ejecting openings 22 and the blade members 31 connected to the rotational center portion 33 by the inner peripheral end portion thereof.

When the fluid, which has entered the inlet path 12 and has been throttled at each of the ejecting openings 22 to obtain an increased pressure, strikes the blade members 31 forcibly, the hydraulic turbine is turned by the hydraulic power around the shaft 7 as the center of rotation. Note that the water which has struck the blade members 31 circulates inside the space and then moves to the outlet path 13, as described above.

The rotational center portion 33 includes a smaller cylindrical portion 33a which is in contact with the shaft 7 to rotate together, a larger cylindrical portion 33b having a larger diameter than the small cylindrical portion 33a, and a plurality of ribs 33c which connects the small cylindrical portion 33a and the larger cylindrical portion 33b by the axial ends thereof. Note that the space between the smaller cylindrical portion 33a and the larger cylindrical portion 33b is made hollow in the axial direction to be a through hollow portion 33d which starts from the space between the rib portions 33c on the hydraulic turbine 3 side as an entrance to the space between the rib portions 33c on the rotator 4 side as an exit. The water ejected to the hydraulic turbine 3 comes into the through hollow portion 33d from the above mentioned entrance and exits from the exit so that the water circulates inside the space, in which the hydraulic turbine 3 and the rotator 4 connected to the hydraulic turbine 3 are placed, to smoothen the rotation of the hydraulic turbine 3 and the rotator 4. When the hydraulic turbine 3 is turned by a hydroelectric power, the rotator 4 rotates around the shaft 7 together with the hydraulic turbine 3.

Thus, the rotator 4 connected to the hydraulic turbine 3 to rotate together with the hydraulic turbine 3 serves as a rotor portion opposed to the stator portion 6, and a cylindrical rotor magnet Mg is fitted into the surface thereof. The outer circumferential surface of the rotor magnet Mg is magnetized in multiple poles. This outer circumferential surface is opposed to the stator portion 6 via the partition wall portion 5c of the cup-shaped case 5. For this reason, when rotating together with the hydraulic turbine 3, the rotator 4 rotates relative to the stator portion 6.

The stator portion 6 is constructed with two layers 6c and 6d which are superposed in the axial direction and shifted in phase. With the stator portion 6 as constructed with two layers, the layers 6c and 6d cancel a detent torque from each other, and thus the detent torque generated between the rotor magnet Mg and the stator portion 6 is reduced as a whole. Note that each of the layers 6c and 6d includes an outer stator core (positioned on the outer side in the state of superposition) 61, an inner stator core (positioned on the inner side in the state of superposition) 62, and a coil 63 wound on a coil bobbin.

In this embodiment, the inner stator cores 62, 62 of the layers 6c and 6d which are arranged next to each other are magnetically insulated from each other. The outer stator cores 61 and 61 of the layers 6c and 6d are respectively configured in a cup shape and the end portions on the outer side thereof are connected and magnetically coupled to each other. This configuration also promotes the mutual cancellation of the detent torque generated in each of the layers 6c and 6d, bringing an effect of the reduction of the detent torque. Note that the winding start portion and winding end portion of the coil 63 are pulled outside of the outer stator cores 61 and 61 from a window (not shown) formed at the connecting portion between the outer stator cores 61 and 61, and respectively connected to the terminal portion 6a.

Each of the outer stator cores 61 and 61 has a plurality of pole teeth 61a formed by bending up the center portion of a cup-shaped member which is formed by drawing. Each of the pole teeth 61a is formed trapezoidal and arranged like a comb with equal intervals in the circumferential direction to be opposed to the outer circumference of the rotor magnet Mg. In the same manner, each of the inner stator cores 62 and 62 has a plurality of pole teeth 62a which are arranged like a comb with equal intervals in the circumferential direction to be opposed to the outer circumference of the rotor magnet Mg. As both of the stator cores 61 and 62 are superposed, the pole teeth 61a and 62a provided in the stator cores 61 and 62 are alternately arranged to be a zigzag in the circumferential direction.

The stator portion 6 configured as above is fitted to the outside of the partition portion 5c of the cup-like case 5. Therefore, there is a magnetic flux between each of the pole teeth 61a and 62 of the stator portion 6 and the magnetized portion of the rotor 4. As described above, when the hydraulic turbine 3 and the rotor 4 rotate together, the direction of the magnetic flux is changed and an induced voltage is generated in the coil 63 in a direction such as to prevent the direction change of the flow. The induced voltage taken in the above manner is converted to a direct-current through a circuit, rectified through a predetermined circuit (not shown), and charged into a battery.

The configuration of the hydraulic turbine 3, which is a feature of the present invention, is described below referring to FIG. 4.

In the plan view in FIG. 4(B), each of the blade members 31 of the hydraulic turbine 3 is configured such that a plane 31b thereof, the side opposite from the plane which receives the fluid, is curved from the inner peripheral end to the outer peripheral point portion with the center portion projected, and the outer peripheral end is made as an edge. The edge portion 31a is formed such that the width thereof is 0.2 mm or less while the width, d1, of the outer peripheral point portion of the hydraulic turbine 3 in FIG. 10 is 1 mm.

In this embodiment, a rotating wing portion 31d is formed extending in the circumferential direction from the edge portion 31a, which is the outer peripheral point portion of the blade member 31. The rotating wing 31d is arranged parallel to the shaftlike rotational center portion 33 which is formed to be perpendicular to the direction in which the water is ejected from the ejecting opening 22, and also not blocking the ejecting opening 22. In other words, the rotating wing 31d is positioned in the section of the blade member 31 not to axially oppose the ejecting opening 22.

More specifically described, the rotating wing 31d extends from the axial end of the outer peripheral point portion of the blade member, the side opposite from the portion to oppose the ejecting opening 22, to the axial midway of the blade member 31. Thus, the wing 31d is formed so as not to oppose the ejecting opening 22. Consequently, the rotating wing 31d does not block the ejecting opening 22, and also the rotational force of the hydraulic turbine 3 can be increased. Note that if the rotational force of the hydraulic turbine 3 can be obtained sufficiently without the rotating wing portion 31d, depending on the specification, the rotating wing 31d may be omitted.

In the plan view of FIG. 4(C), each of the blade members 31 of the hydraulic turbine 3 is curved from the inner peripheral end portion to the outer peripheral point portion with the center portion projected. The external shape of the plane 31b, the side opposite from the plane which receives the fluid, is made round in an R-shape to eliminate square corners and edges.

Further, in the front view of FIG. 4(A), each of the blade members 31 of the hydraulic turbine 3 is formed such that the axial end portion 31c on the side near the ejecting opening 22 is also made in an R-like round shape to eliminate square corners and edges.

When the hydraulic turbines having the above configuration is used, the water ejected from the ejecting openings 22 hits on the front side of the blade members 31 of the hydraulic turbine 3, and then the hydraulic turbine 3 is turned by the kinetic energy of the water. At that time, the closer to the water ejecting openings 22 the blade members 31 of the hydraulic turbine 3 are and the closer to 90 degree the water hits the blade members 31 at, the higher the energy of the water becomes when hitting on the blade members 31, whereby the hydraulic turbine 3 rotates forcibly.

The longer the distance is from the ejecting opening 22 to the blade member 31, the smaller the energy is to be transmitted to the hydraulic turbine 3. For this reason, when the distance is large, the ejecting opening 22 is blocked by the outer peripheral portion of the hydraulic turbine 3 to guide the water to other areas so that the water flow in other areas is increased to increase the rotation of the hydraulic turbine. However, in this conventional method, if the flow of the water passing through the tap is plenty and the ejecting opening 22 is blocked by the outer periphery of the hydraulic turbine 3, the above mentioned problem occurs.

Figure 5:
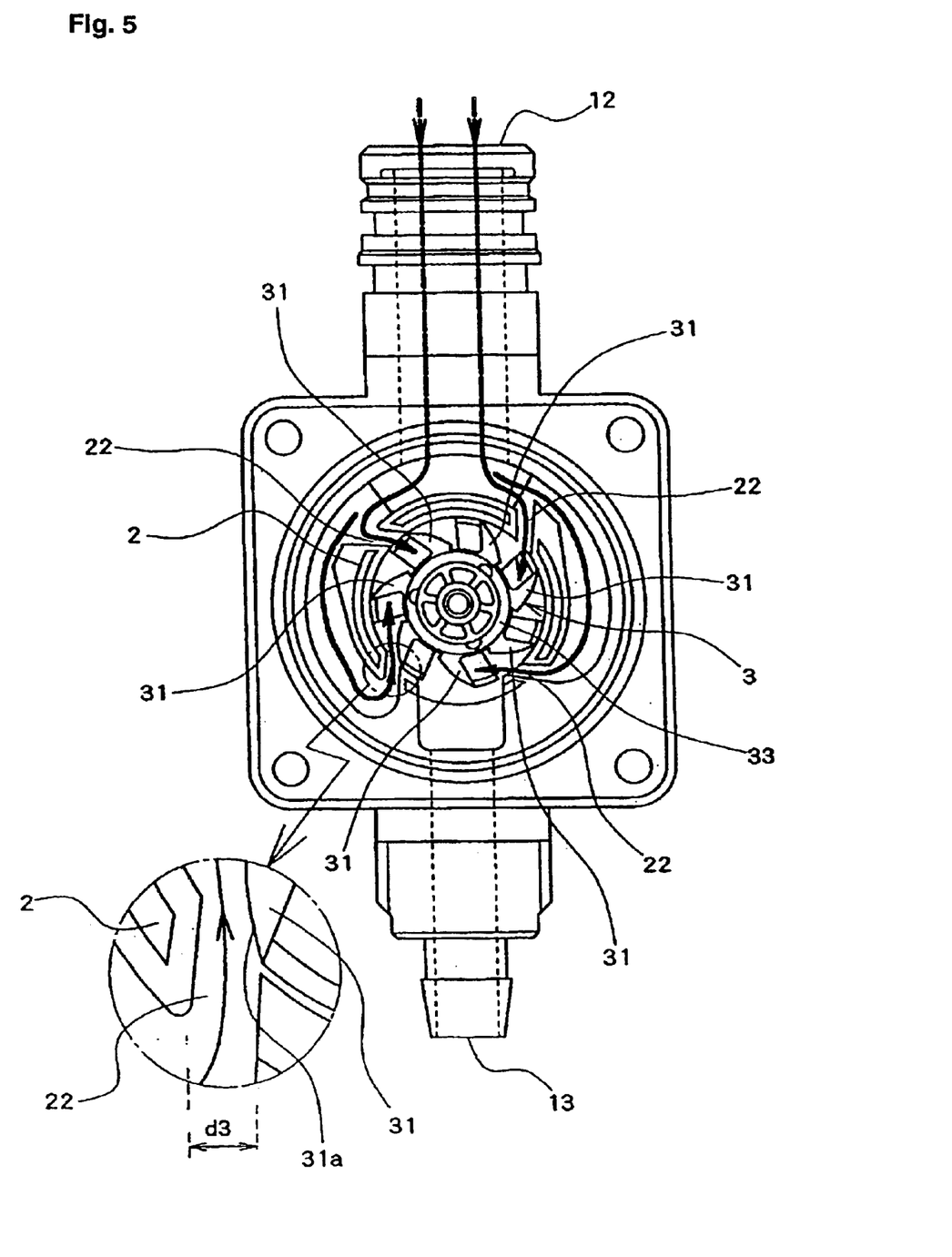
FIG. 5 is a diagram showing the positional relationship between the blade members of the hydraulic turbine and the ejecting openings in the small hydroelectric power generator of FIG. 1.

On the other hand, in the present invention, the outer peripheral point portion of the blade member 31 of the hydraulic turbine 3 is formed in an edge shape having the width of 0.2 mm or less. Therefore, as shown in FIG. 5 with a enlarged sectional view, the ejecting opening 22 having the width, d3 (set to be approximately 1.5 mm in this embodiment) will not be blocked by the edge portion 31a of the blade member 31 of the hydraulic turbine 3.

Consequently the hydraulic pressure and the current are kept constant. Also, since the water is constantly ejected from the ejecting openings 22 at four locations, the hydraulic turbine 3 rotates smoothly and the rotational noise is reduced. Further, since the hydraulic pressure and the current are kept constant, the vibration noise from the main case 1 and the current noise are also reduced.

When the hydraulic turbine 3 is turned, the water ejected from the ejecting openings 22 also hits on the back plane of the blade member 31 (the outer side of the curved member). Since the square corners and edges of the back plane (which includes the plane 31b, the side opposite from the plane which receives the fluid, and the end portion 31c) are removed to form the plane in an R-like shape, a generation of a reverse torque is prevented to smoothen the current and in turn to reduce the noise.

The shape of the blade member 31 on the front side in this embodiment is R-shaped (round) near the root. Therefore, this helps the water to move smoothly after hitting on the blade members 31, whereby the hydraulic turbine 3 rotates more smoothly.

Figure 6:
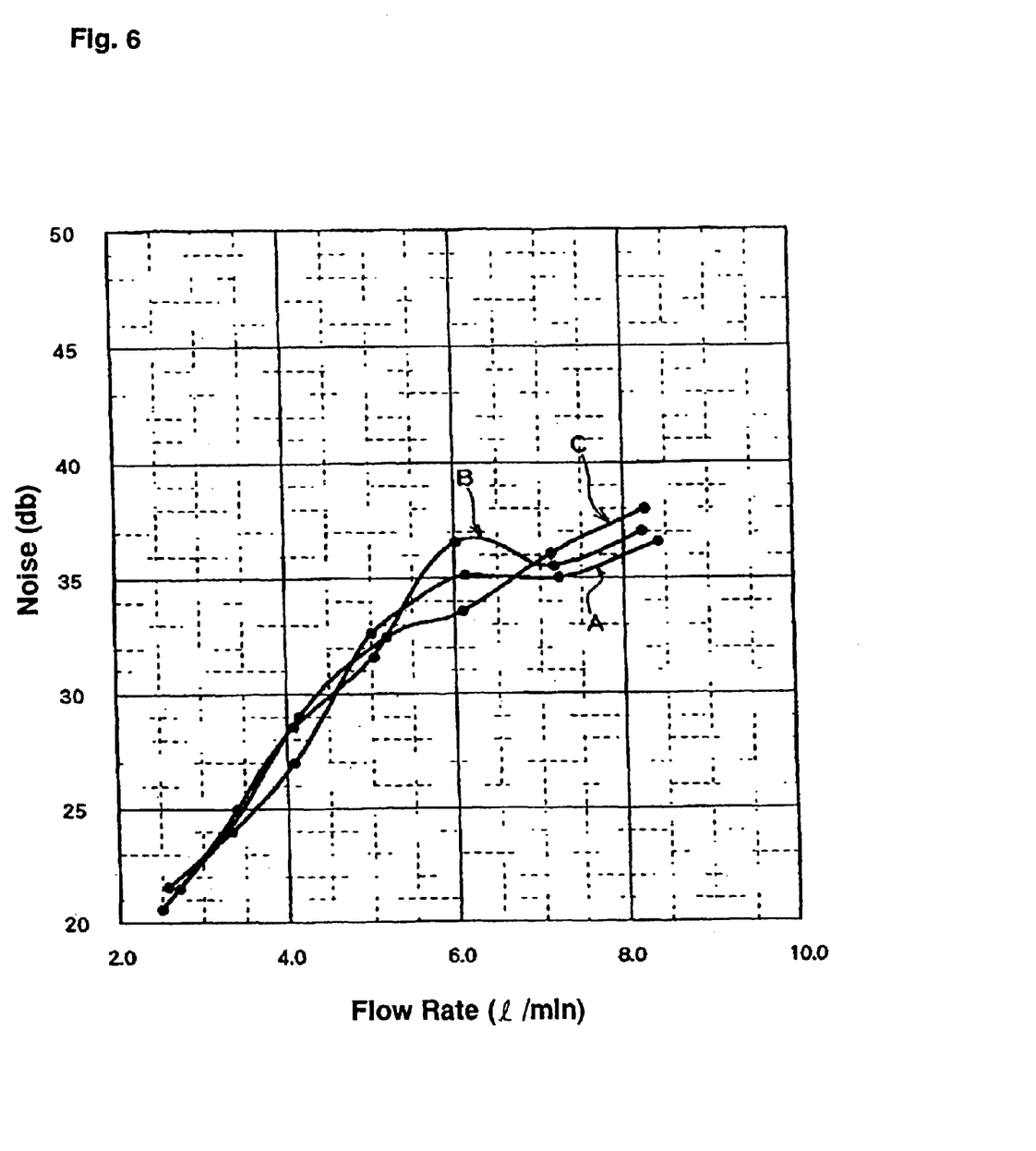
FIG. 6 is a graph of flow rate versus noise when the hydraulic turbine and the rotator described referring to FIG. 4 are formed such that an edge portion is formed but the plane, the side opposite from the plane which receives the fluid, and an end portion are not provided like an R-like round shape.

FIG. 6 is a graph of flow rate (liter/minute) versus noise (decibel) when the hydraulic turbine 3 and the rotor 4 described referring to FIG. 4 are formed such that the edge portion 31a is formed as it is in FIG. 4 but the plane 31b, the side opposite from the plane which receives the fluid, and the end portion 31c are not made like an R-like round shape. The graph shows three samples A, B and C of the hydraulic turbine and the rotator, all of which are configured the same; it is clear that in two of three samples, the noise generated at around the flow rate of 6 liter/minute is below 35 decibel.

In other words, although the outer peripheral point portion of the blade member 31 is formed in an edge-shape and the plane 31b, the side opposite from the plane which receives the fluid, and the end portion 31c are formed in an R-like round shape in the above described embodiment, even without the R-like round shape in the plane 31b and the end portion 31c, only the edge portion 31a may be able to provide an effect of vibration reduction and noise reduction to some extent. Therefore, depending on the specification, the R-like round shape need not be provided to the plane 31b, the side opposite from the plane which receives the fluid, and the end portion 31c.

Figure 7:
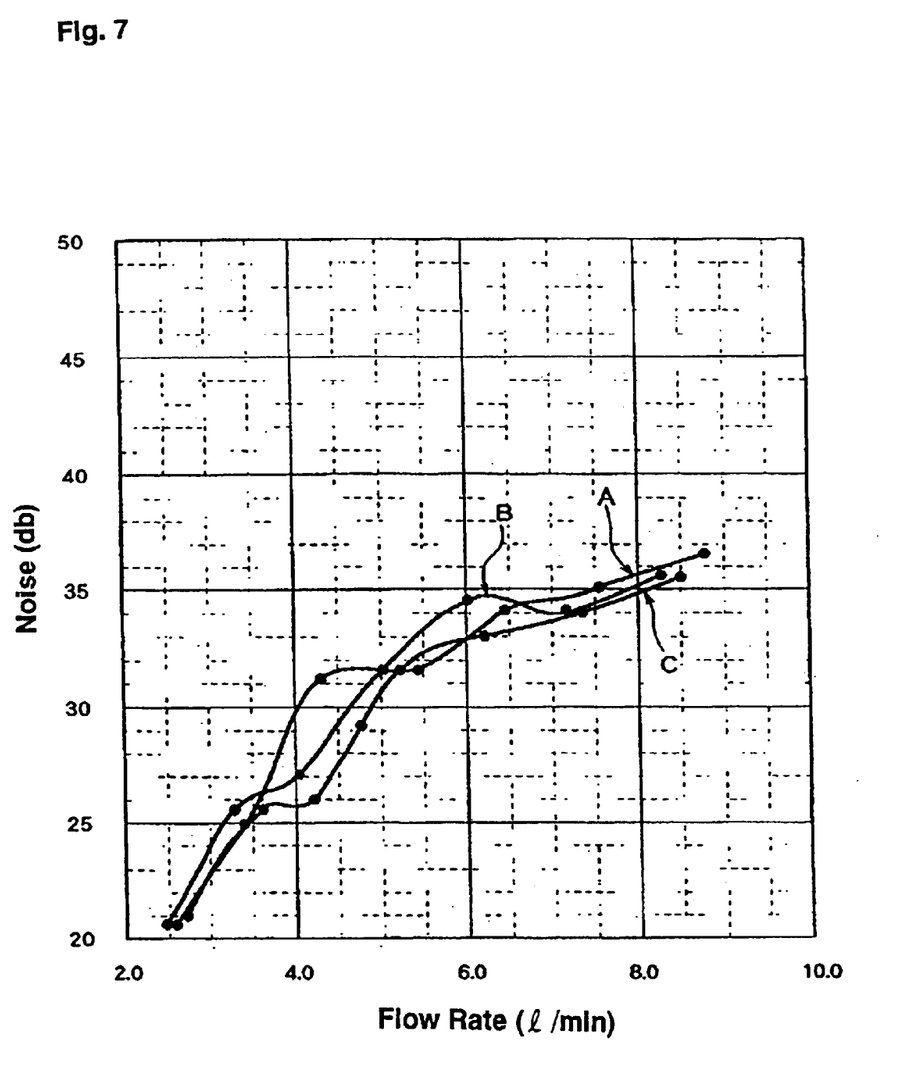
FIG. 7 is a graph of flow rate versus noise when the hydraulic turbine and the rotator described referring to FIG. 4 are formed such that the edge portion is formed and the plane, the side opposite from the plane which receives the fluid, and the end portion are provided like an R-like round shape.

FIG. 7 is a graph of flow rate (liter/minute) versus noise (decibel) when the hydraulic turbine 3 and the rotator 4 described referring to FIG. 4 are formed such that the edge portion 31a is formed as it is in FIG. 4 and the plane 31b, the side opposite from the plane which receives the fluid, and the end portion 31c are formed in an R-like round shape. The graph shows three samples A, B and C of the hydraulic turbine and the rotator, all of which are configured the same; it is clear that in all of the samples, the noise generated at around the flow rate of 6 liter/minute is below 35 decibel. Thus, as shown in FIG. 7, the configuration of the plane 31b, the side opposite from the plane which receives the fluid, and the end portion 31c in an R-like round shape can provide a better effect of the vibration reduction and noise reduction, compared to the one without.

Although the embodiment of the present invention is described as above, the present invention is not limited to this embodiment, but various modifications and applications are possible. For example, in the above embodiment, the hydraulic turbine 3 is configured without the ring portion 32 of FIG. 8; however, the same ring portion as the ring portion 32 of FIG. 8 may be added to the configuration of FIG. 4.

Also, although the hydraulic turbine 3 is arranged such that the rotational center portion 33 thereof is positioned to be perpendicular to the ejecting openings 22 in the above embodiment, it may be arranged such that the rotational center portion 33 is positioned to be parallel to the ejecting openings 22.

Further, although the outer peripheral point portion of the blade member 31 of the hydraulic turbine 3 is formed as the edge potion 31a having the width, d1, of 0.2 mm or less while the width, d3, of the ejecting opening 22 is set to 1.5 mm, the dimensional relationship between the width, d3, of the ejecting opening 22 and the width, d1, of the edge portion 31a is not limited to this. It is confirmed that the noise generation can be reduced as long as the width, d1, of the edge portion 31a is set 30% or less of the width, d3, of the ejecting opening 22.

The present invention is not to be considered limited in scope by the preferred embodiments described in the specification. Additional advantages and modifications, which will readily occur to those skilled in the art from consideration of the specification and practice of the invention, are intended to be within the scope and spirit of following claims.

What is claimed is:

1. A small hydroelectric power generator comprising:
    a main case with a fluid path,
    a hydraulic turbine which is arranged in said fluid pathway and turns as a predetermined flow of a fluid passes by, and
    a rotator connected to said hydraulic turbine to rotate together with said hydraulic turbine, said rotator acting as a rotor portion opposed to a stator portion, so that power is generated by rotating said rotor portion relative to said stator portion as said fluid passes by;
    wherein a plurality of ejecting openings are provided in said fluid pathway outside the rotational path of said hydraulic turbine for reducing an area of a flow of said fluid and for ejecting said fluid;
    said hydraulic turbine has a rotational center portion and blade members which are hit by said fluid ejected from said ejecting openings, said blade members being formed such that an inner peripheral end portion is joined to said rotational center portion and outer peripheral point portions are extended toward the vicinity of said ejecting openings; and
    each of said outer peripheral point portions of said blade members is formed in an edge-shape.

2. The small hydroelectric power generator as set forth in claim 1 wherein the width of said edge-shaped portion of said blade member in the circumferential direction is 30% or less of that of said ejecting opening in the rotational direction of said hydraulic turbine.

3. The small hydroelectric power generator as set forth in claim 1 wherein the plane of said blade member, the side opposite from the plane which is hit by said fluid, is curved from the inner peripheral end portion to the outer peripheral point portion with the center portion projected.

4. A hydroelectric power generator comprising:
    a case having a fluid path;
    a hydraulic turbine disposed in the fluid pathway and operable to turn as fluid passes;
    a plurality of ejection openings provided in the fluid pathway outside the rotational path of the hydraulic turbine and operable to eject the fluid;
    the hydraulic turbine including a rotational center portion and a plurality of blades that are struck by the fluid ejected from the ejection openings, each blade having an inner peripheral end portion joined to the rotational center portion and an outer peripheral portion extended toward the vicinity of the ejection openings, wherein the outer peripheral portion of each blade has an edge-shape.

5. The small hydroelectric power generator as set forth in claim 4 wherein the width of the edge-shape of the outer peripheral portion in the circumferential direction is 30% or less than the width of the ejection opening in the rotational direction of the hydraulic turbine.

6. The small hydroelectric power generator as set forth in claim 4 wherein the plane of the blade opposite from the plane that is struck by the fluid is curved from the inner peripheral end portion to the outer peripheral portion with a center portion of the blade projected.

* * * * *